Patented Oct. 20, 1925.

1,558,163

UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

REVIVIFYING FULLER'S EARTH.

No Drawing.     Application filed January 8, 1925. Serial No. 1,314.

*To all whom it may concern:*

Be it known that I, FRANK W. HALL, a citizen of the United States of America, and a resident of Port Arthur, county of Jefferson, and State of Texas, have invented certain new and useful Improvements in Revivifying Fuller's Earth, of which the following is a specification.

This invention relates to methods of treating fuller's earth or other equivalent adsorbent material which has been used in the refining of hydrocarbon oils and contemplates a process of removing adsorbed oil and other occluded matter from the pores of the clay and the rejuvenation of the adsorbent qualities of the clay.

It is generally recognized that the coloring element in hydrocarbon oils consists of asphaltic material in colloidal form and when filtering these oils to improve the color thereof the colloidal asphalt is adsorbed in the pores of the filtering medium. In common practice the adsorptive clays generally referred to as fuller's earth which have been used in filtering petroleum oils are subjected to a treatment in which the spent clay is washed with gasoline or naphtha, steamed and then burned in a rotary kiln. Each time, however, that the clay is treated in this way its decolorizing qualities are greatly reduced and after a few burnings it is so greatly deteriorated that it is practically worthless for the usual filtering treatment of oils. The reduction in the adsorptive qualities of the clay is due, no doubt, to the fact that the treatment with the oil solvent does not remove the occluded coloring matter from the pores of the earth particles, or at least removes but a very small proportion of the asphaltic material, and in the subsequent burning only the more exposed portions of the coloring matter are oxidized, a large part being carbonized within the pores of the clay. The only way in which the asphalt held in the interior interstices of the clay can be burned out is by distilling through the pores to the surface and in this distillation a large portion of the asphalt is carbonized and retained within the pores. It would be impossible to remove all the asphalt even by the use of high temperatures, but in any case such a method of procedure is not practical because if the fuller's earth be heated excessively its active structure is broken down, either due to excessive dehydration or to the fluxing of certain constituents of the clay, and its decolorizing properties destroyed.

It is an important object of my invention to recover and revivify decolorizing clays or fuller's earths which have been used in the refining of hydrocarbon oils, and which are of such composition that their adsorbing properties are destroyed when exposed to temperatures necessary for recovery by the usual method of applying direct heat.

I have discovered that the spent clay may be treated with some of the usual oil and asphalt solvents without any appreciable amount of the asphalt being removed. This is apparently due to the fact that some solvents do not possess the peculiar properties required for extracting the asphalt from a porous material. I have found, however, that certain solvents, particularly certain mixed solvents, do possess the property of extracting this coloring matter.

Thus I have found that benzol alone is not a good color extracting solvent for use in revivifying spent fuller's earth but that the addition to the benzol of a small quantity, say about 10% by volume, of acetone will greatly increase its efficiency as an extracting solvent. Further additions of acetone do not appreciably increase the extraction power of the solvent and mixtures of benzol and acetone containing approximately 10%–15% of acetone are almost if not quite as efficient as pure acetone itself.

In order to more fully disclose my invention I will now proceed to explain in detail a preferred method of operation. The spent clay which has been used in the filtering or refining of hydrocarbon oils may first be steamed in order to remove as much entrained oil as possible. The steaming may be followed by washing with gasoline or naphtha or benzol for the purpose of removing any oil remaining in the clay. The earth may then be steamed again to drive off the oil solvent after which it is washed with the extracting solvent such as a mixture of acetone and gasoline, or other solvent that has the property of removing substantial proportions of the occluded asphalt. Another wash with gasoline or benzol may then be given the clay in order to remove the extracting solvent after which the clay may be steamed to remove the solvent and dried by blowing with a current of air.

Inasmuch as this treatment removes substantially all the occluded asphalt from the clay it is not necessary to subject it to the usual burning. It is thus possible by means of my process to employ the clay repeatedly for filtering or treating hydrocarbon oils, the clay after each treatment being readily restored to approximately its original efficiency. If desired, after a number of such treatments, the clay may be burned and in this way the life of the clay is greatly prolonged.

Attention is directed to the fact that the steam used for heating the fuller's earth to drive off the entrained oil or oil solvent is preferably superheated in order that the necessary heat may be applied without producing any excessive moisture in the clay. It is undesirable to have any appreciable moisture remaining in the clay prior to the treatment with the color extracting solvent, e. g., when using a solvent containing acetone the clay should be as dry as possible in order to avoid the difficulty of separating the acetone from the water in the subsequent distilling to recover the solvent.

It is not necessary to use a solvent to remove the oil in the clay as substantially all the oil may be removed by heating with superheated steam, the small traces remaining not interfering with the extraction of the coloring matter. Moreover the oil and coloring matter may be removed in a single step as a solvent capable of extracting the occluded asphalt will also dissolve the oil. The disadvantage in this method of procedure, however, resides in the fact that it is necessary to distill a greater volume of liquid for the recovery of the solvent.

Obviously the invention is not restricted to the specific mode of operation set forth, as the advantages and benefits thereof may be obtained to a greater or less degree by variations from the process herein disclosed in detail. Therefore, only such limitations should be employed as are indicated in the appended claims.

I claim:

1. The process of treating decolorizing clays which have been used in refining hydrocarbon oil which comprises washing the clay with a solvent comprising acetone and benzol.

2. The process of treating decolorizing clays which have been used in refining hydrocarbon oil, which comprises washing the clay with a solvent comprising a large percentage of benzol and a small percentage of acetone.

In witness whereof I have hereunto set my hand this 18th day of November, 1924.

FRANK W. HALL.